INVENTOR.
JOHN A. SHEARING
ATTORNEY

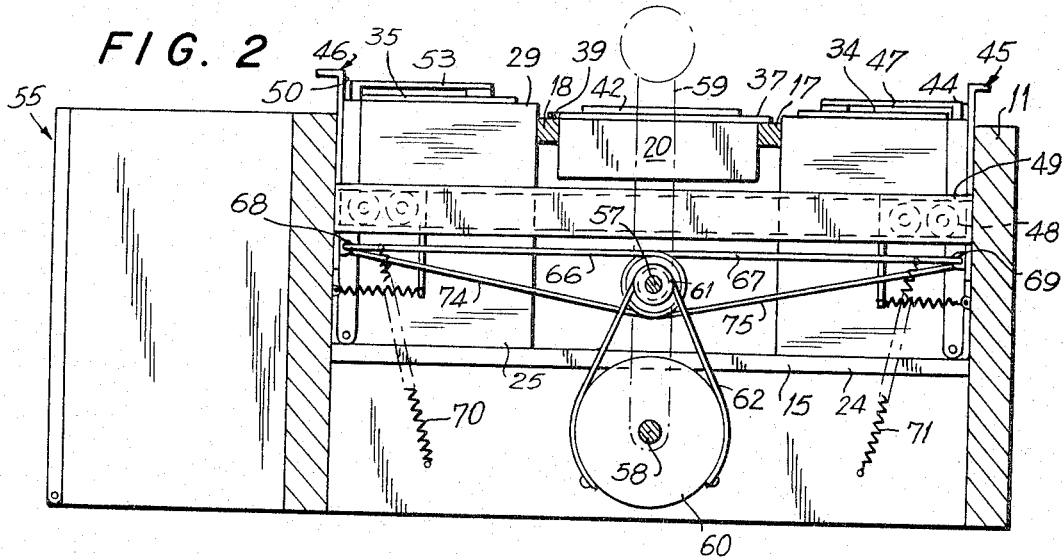

Jan. 16, 1968   J. A. SHEARING   3,364,453
STAGE-LIGHTING CONTROL APPARATUS
Filed April 6, 1966   3 Sheets-Sheet 3

INVENTOR.
JOHN A. SHEARING
BY
ATTORNEY

United States Patent Office 3,364,453
Patented Jan. 16, 1968

3,364,453
STAGE-LIGHTING CONTROL APPARATUS
John A. Shearing, Forest Hills, N.Y., assignor to Symplicon, Inc., New York, N.Y., a corporation of New York
Filed Apr. 6, 1966, Ser. No. 540,747
8 Claims. (Cl. 338—130)

This invention relates generally to control apparatus for stage lighting.

As is well known to those versed in the art, it is the present general practice to provide for each electrician two groups of fourteen rheostats each connected to respective master rheostats. Thus, each electrician controls twenty-eight circuits, which requires a high degree of skill and experience. Further, a particular stage show may employ 100 or more circuits, requiring several electricians.

As presently practiced, the rheostats are mounted on a large control panel permanently located so that the electrician cannot observe the lighting effects while operating the rheostats or switches.

The electricians work from a sequence of cues, and learn the operation for a particular show in the required sequence. It is therefore impossible to revert to a particular prior cue without repeating all previous cues up to the desired cue. This often involves considerable time, sometimes as much as twenty minutes, which is extremely expensive.

A further limitation in the present operation of rheostats is the necessary time delay in particular operations requiring the movement of considerable rheostat handles or actuating elements. It is also necessary in present practice that the electricians expend many hours of practice time to master the lighting cues for a particular show, so that a fully rehearsed electrician is essential to every performance.

It is also apparent that the hand operation involved in conventional stage-lighting control is subject to considerable human error, which, in fact, does occur.

Accordingly, it is among the important objects of the present invention to provide a stage-lighting control apparatus which overcomes the above-mentioned difficulties, which may be located more advantageously, as desired, say for the operator to observe the lighting effects controlled, wherein an operator may almost instantaneously revert to any desired previous cue, which may be extremely rapid in operation, or of any desired speed, and wherein an operator without rehearsal, skill or experience may perfectly effect any desired lighting-control operation.

It is a further object of the present invention to provide a stage-control lighting apparatus of the type described which substantially reduces the number of electricians or operators required for a particular show, enables the performance of relatively difficult techniques, such as cross-fading with extreme accuracy and ease, and which apparatus is durable and reliable throughout a long useful life, and can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 2 is a sectional elevational view taken generally along the line 2—2 of FIGURE 1;

FIGURE 3 is a sectional elevational view taken generally along the line 3—3 of FIGURE 1;

FIGURE 9 is a partial top perspective view, partly broken away, illustrating another embodiment of template; and FIGURE 10 is a top perspective view, also partly broken away illustrating still a further embodiment of template.

Figure 1:
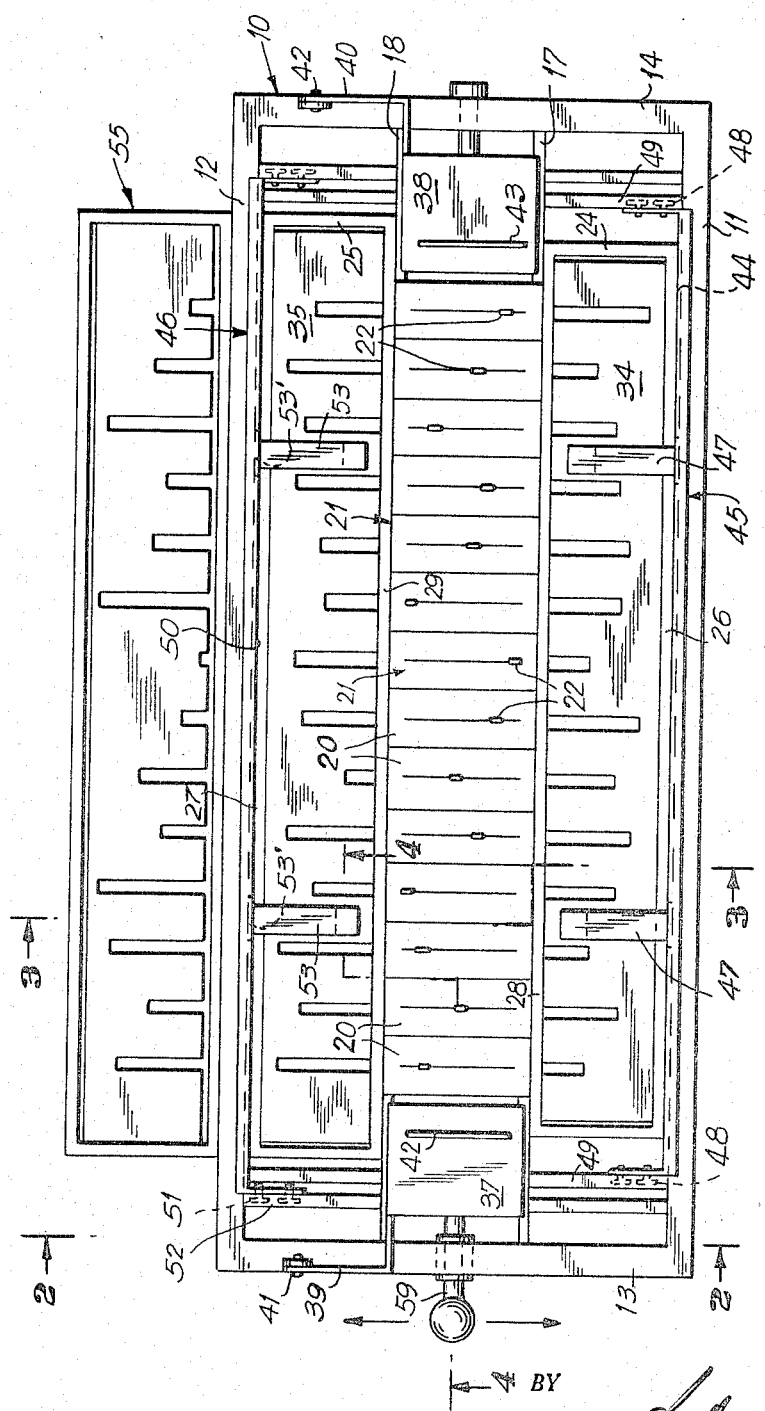
FIGURE 1 is a top plan view showing a stage-lighting control apparatus constructed in accordance with the teachings of the present invention.
Figure 4:
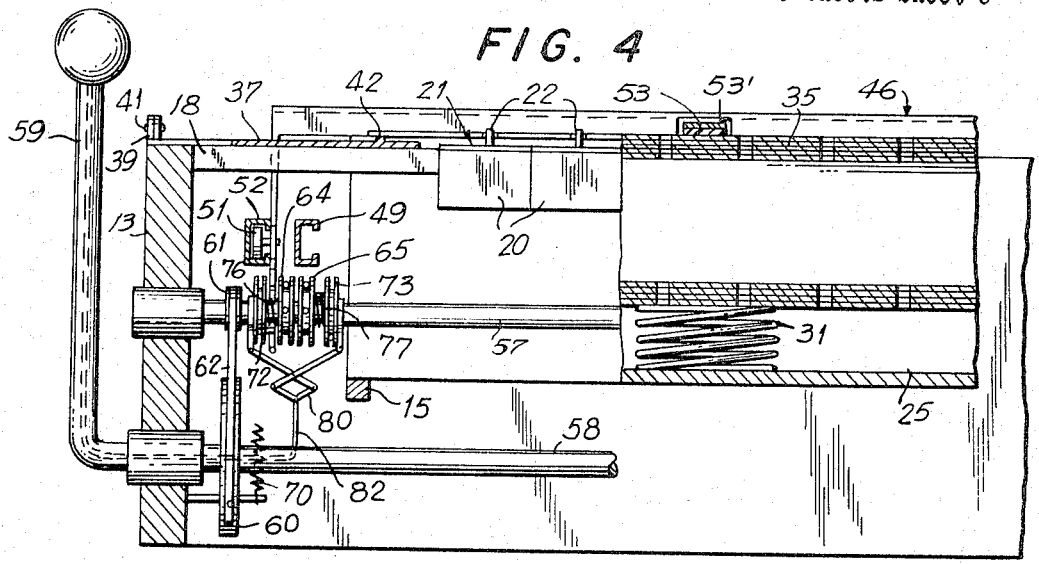
FIGURE 4 is a partial longitudinal sectional elevational view taken generally along the line 4—4 of FIGURE 1.
Figure 5:
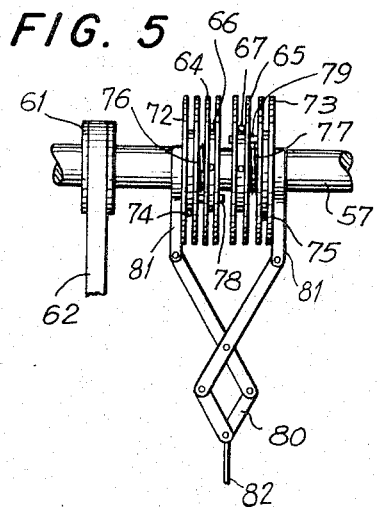
FIGURE 5 is an enlarged fragmentary view of elements of FIGURE 4 in a different condition of use.

Referring now more particularly to the drawings, and specifically to FIGURES 1–3 thereof, a housing is there generally designated 10, and may be of an elongate, generally rectangular upwardly opening configuration, having upstanding longitudinal side walls 11 and 12, and upstanding end walls 13 and 14 extending between opposite ends of the side walls. Laterally extending, horizontal supports 15 and 16 may extend between opposite side walls 11 and 12, spaced below the upper edges thereof. A pair of longitudinally extending, generally horizontal supports 17 and 18 may be provided interiorly of the housing 10 extending between opposite end walls 13 and 14 substantially flush with the upper edges thereof. The longitudinal supports 17 and 18 are laterally spaced apart and spaced laterally inward between the side walls 11 and 12.

A row of suitable switch means, such as rheostats 20 may be arranged intermediate and resting on the supports 17 and 18. That is, the rheostats 20 are arranged in a row 21 extending longitudinally of the housing 10 between the supports 17 and 18 with the individual rheostats 20 of the row in side-by-side relation having their actuating elements or handles 22 movable transversely of the row for operating the rheostats.

Extending longitudinally along opposite sides of the rheostat row 21, received in the housing 10, are a pair of template holders or receptacles 24 and 25. The holders 24 and 25 may be generally boxlike in construction, having their upper sides open, and resting on the transverse support members 15 and 16. If desired, the holders 24 and 25 may have one side hinged, as at 26 and 27, respectively, and the holders may be removable from the housing 10, thereby facilitating access to the interiors of the holders. It will be observed that the upper edge 28 of holder 24 may be substantially flush with the upper surfaces of rheostats 20, while the upper edge 29 of holder 25 may be above the upper surfaces of the rheostats, for a purpose appearing presently.

Interiorly of the holders 24 and 25 may be located coil compression springs 30 and 31, or other suitable means for supporting template stacks 32 and 33 in the respective holders with the uppermost templates 34 and 35 of the respective stacks proximate to the upper edges of the holders.

Template-support members or plates 37 and 38 may rest on the supports 17 and 18 adjacent to the opposite ends of the rheostat row 21. The template-support plates 37 and 38 may have their upper surfaces substantially flush with the upper faces of rheostats 20. An arm may extend from each template-support member or plate 37 and 38, as at 39 and 40, respectively, for pivotal connection, as at 41 and 42, to the housing 10. In this manner the template-support members 37 and 38 are mounted for swinging movement downward to their illustrated position, and upward on one side of the housing. The template support members 37 and 38 are each provided with a raised rib or land, as at 42 and 43, respectively, and the upper edge 29 of holder 25 is level with the upper surfaces of lands 42 and 43. Further, as best seen in FIGURE 1, the template holder 24 is of a length greater than the row 21 of rheostats 20, extending beyond the latter at opposite ends thereof; while the template holder 25 is of a length greater than that of the template holder 24 to extend beyond opposite ends of the template holder 24. It will also be seen in FIGURE 1 that the uppermost template 34 in holder 24 is of a length greater than the rheostat row 21, so that if overlaid on the rheostat row the end portions of template 34 would rest on template supports 37 and 38, but inward of the lands 42 and 43. However, the length of uppermost template 35 in holder 25 is greater than that of template 34, and of sufficient length to rest on the lands 42 and 43 when overlying the rheostat row 21.

There are provided at 45 and 46 means for feeding the uppermost templates 34 and 35 laterally from their respective stacks into overlying relation with the rheostat row 21. The feeding means 45 may include a longitudinally extending angle bar 44 located with its lower edge proximate to the upper holder edge 28 and mounted for horizontal lateral movement for engaging the outer edge of the uppermost template 34 and shifting the latter laterally onto the rheostat row 21. One or more hold-down members or fingers 47 may extend from the upper edge of box side 26 to engage with the uppermost template 34 and retain the latter in the illustrated position of FIGURE 3, against the resilient force of spring 30. The feeder bar 44 may extend longitudinally beyond opposite ends of the holder 25, and there be mounted, as by rollers 48, or other suitable means, for lateral movement along laterally extending horizontally fixed tracks or guides 49. Suitable cutouts 53' may be formed in bar 44 to clear the fingers 47.

The feeding means 46 is similar to the feeding means 45, including an angle bar 50 extending longitudinally along the holder 25 with its lower edge substantially level with the upper holder edge 29. The feeder bar 50 may extend longitudinally beyond the holder 25 and be mounted at its opposite ends, as by rollers 51 on a horizontal track 52 for lateral movement across the holder. Hold-down members or fingers 53 may extend laterally from the upper edge of box side 27 for retaining engagement with the uppermost template 35 against the force of stack-support means 31. Upon lateral movement of feeding means 46, the lower edge portion of feed-bar 50 engages with the uppermost template 35 to shift the latter laterally over the rheostat row 21 at an elevation to rest on the bosses or lands 42 and 43, and consequently overlie the template 34 from the holder 24. By this arrangement a pair of templates from opposite template holders may be shifted simultaneously over the rheostat row 21. The bar 50 is approximately cut-out to pass over the fingers 53.

Along one side of the housing 10 may be an upwardly open storage receptacle or bin 55. The bin 55 is located to receive templates from the template support members 37 and 38 when the latter are swung upward away from the rheostat row 21. Thus, the bin 55 stores the used templates in their order of use.

Operation of the feeding means 45 and 46 may be accomplished in any desired manner, one such mechanism being illustrated. In FIGURES 2 and 4–6, there are shown a pair of generally horizontal, longitudinally extending rotary shafts 57 and 58, which may be arranged along the longitudinal centerline of housing 10, spaced one above the other and beneath the rheostat row 21. The lower rotary shaft 58 may be provided on one end with a handle or operating lever 59 externally beyond the housing end 13 for effecting rotary oscillation of the shaft 58. A drum 60 is carried by the shaft 58 and effects rotary driving of shaft 57 by a drum 61 on the latter shaft and belt means 62 connected between the drums 60 and 61. Thus, the shaft 57 may be rotatably oscillated by back-and-forth swinging movement of lever 59.

A pair of pulleys or drums 64 and 65 are keyed to shaft 57 for rotation therewith, and respective elongate flexible elements, belts or bands 66 and 67 are secured at one end to the pulleys. The other ends of the belts 66 and 67 may extend through respective eyes 68 and 69 carried by feeding means 46 and 45. The other ends of the belts may be wound about and anchored to the respective pulleys, whereby rotation of shaft 57 in opposite directions effects additional winding of one belt 66 or 67, and unwinding of the other belt. The additionally wound belt serves to draw its associated feeding means laterally inward for effecting the template-feeding operation, while the unwound belt may be taken up by a respective spring, as at 70 and 71. Freely rotatable on the shaft 57, on opposite sides of the pulleys 64 and 65 may be an additional pair of pulleys or drums 72 and 73 connected by belts or tie means 74 and 75 to respective feeding mechanisms 46 and 45 to shift the feeding mechanisms upon rotation of the pulleys. Further, the pulleys 72 and 73 are so connected by their belts 74 and 75 as to actuate the otherwise unactuated feeding mechanism upon rotation of lever 59 in either direction. While the pulleys 72 and 73 are normally freely circumposed about shaft 57 and yieldably spaced from respective pulleys 64 and 65 by springs 76 and 77, the outer pulleys 72 and 73 are shiftable inward toward each other and nonrotatably interengageable with the pulleys 64 and 65, as by keying members or pins 78 and 79. This shifting of pulleys 72 and 73 against the forces of springs 76 and 77 into nonrotative engagement with the pulleys 64 and 65 and shaft 57 may be effected by any suitable means, such as a lazy-tongs mechanism 80 having end yokes 81 engageable with respective outer pulleys. The lazy-tongs mechanism may be actuated by any suitable means, such as a cable 82 passing through arm 59, as for actuation from the end thereof by any suitable mechanism.

It will therefore be appreciated that the feed mechanisms 45 and 46 are independently actuable upon oscillation of the arm 59 in a respective direction, and may be simultaneously actuated by elongation of the lazy-tongs mechanism 80 and oscillation of the arm in either direction.

Figure 7:
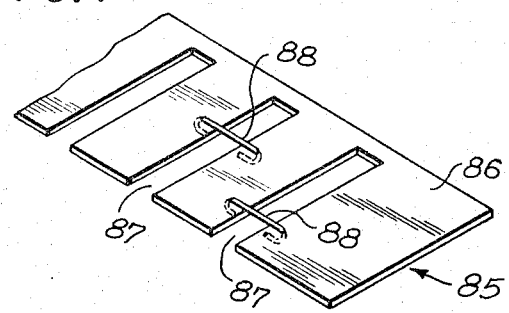
FIGURE 7 is a partial top perspective view showing one form of template adapted to be employed in practice of the instant invention.
Figure 6:
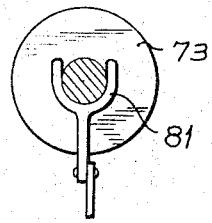
FIGURE 6 is an end view of the mechanism shown in FIGURE 5.

The templates described hereinbefore may each include an elongate sheet of any suitable material having notches extending laterally inward from one side edge and spaced longitudinally along the sheets. The templates may be fabricated of any suitable, relatively stiff material. One embodiment of template is generally designated 85 in FIGURE 7, and may be formed from stiff cardboard, sheet metal, plastic or the like. The template sheet 86 may be formed with a series of laterally inwardly extending notches or cutouts 87, which in this embodiment are all of similar depth, terminating at equal distances from the opposite side edge of the template. However, the notches 87 are provided with inserts 88, such as staples, or other suitable means fixedly extending across respective notches 87 at selected distances from the open ends thereof.

Figure 8:
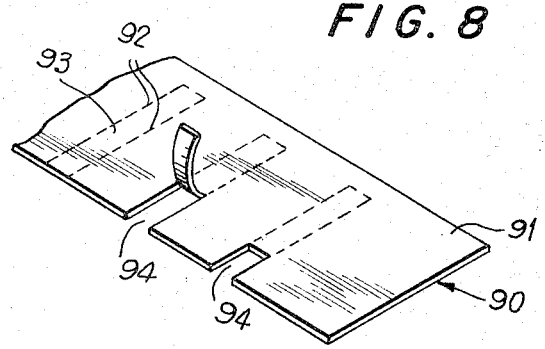
FIGURE 8 is a partial top perspective view showing another form of template for use in accordance with the teachings of the present invention.

Another embodiment of template is shown in FIGURE 8, and there generally designated 90, as including an elongate sheet 91 having longitudinally spaced pairs of severance lines 92 extending laterally inward from one side edge of the sheet. The severance lines afford means for severance thereof to remove the sheet material 93 between the severance lines to define laterally inwardly extending notches 94. The depth or terminus of a respective notch 94 is selectively determined by the amount of material 92 removed.

Another embodiment of template is shown in FIGURE 9, there being generally designated 95 and formed with notches 96 having beveled edges. An insert 97, having mating edges is insertable into respective notches 96, the length of the insert determining the depth of the respective notch.

Still another embodiment of template is shown in FIGURE 10, there being generally designated 100 and formed with notches 101 also having beveled edges. An insert 102, say in the manner of a plug having sides conformable to the edges of notch 101 is insertable therein at a selected location therealong to determine the terminus of the notch.

The operation of the instant apparatus is believed apparent from the foregoing description, so that a brief review will suffice. In a predetermined order or arrangement, the templates of stacks 32 and 33 are inserted into their holders 24 and 25. The templates are preconfigured, their notches being previously formed of desired depth, so that it is only necessary for an operator to shift the lever 59 in one direction to move a template from one stack over the rheostat row 21, or shift the lever in the other direction to move a template from the other holder over the rheostat row. As discussed before, a pair of templates from both rows may be shifted into rheostat-overlying relationship simultaneously. The rheostat handles 22 are received in respective notches of the templates and engaged by the termini of the notches to effect the desired rheostat actuation. Removal of previously used templates is effected by raising of the template supports 37 and 38 to discharge the templates to the storage bin 55. Thus, fade-in may be achieved by movement of lever 59 in one direction and fade-out by lever movement in the other direction, while cross-fade may be accomplished by lever movement in either direction and actuation of lazy-tongs mechanism 80 to effect the simultaneous template feeding from both stacks.

From the foregoing, it is seen that the present invention provides a stage-lighting control apparatus which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Stage-lighting control apparatus comprising a plurality of rheostats arranged in a row with their actuating elements movable transversely of the row in one direction to effect fade-in and in the other direction to effect fade-out, a pair of template holders extending along opposite sides of said row of rheostats, a stack of templates held by each of said holders, and feeding means for feeding the uppermost templates from said stacks laterally onto said row of rheostats, said templates being configured to engage said actuating elements to operate said rheostats.

2. Stage-lighting control apparatus according to claim 1, said feeding means comprising a feeder associated with each stack of templates for feeding the uppermost template from a selected stack, for fading-in and the fading-out.

3. Stage-lighting control apparatus according to claim 2, said feeding means comprising selectively operable connection means between said feeders for simultaneously feeding templates from both stacks for effecting cross-fade.

4. Stage-lighting control apparatus according to claim 1, in combination with stack-support means in each template holder for maintaining the uppermost template of each stack at a selected elevation for feeding therefrom.

5. Stage-lighting control apparatus according to claim 4, in combination with template-support means associated with said row of rheostats for supporting the templates fed from one stack over the templates fed from the other stack, for simultaneous actuation of rheostats by templates from both stacks.

6. Stage-lighting control apparatus according to claim 1, in combination with template-support means associated with said row of rheostats for supporting templates fed from said stacks, and mounting means mounting said template-support means for swinging movement toward and away from said rheostats to discharge templates from said row of rheostats.

7. Stage-lighting control apparatus according to claim 1, said templates each comprising a generally flat elongate sheet, said template sheets each having a plurality of notches extending inwardly from one side edge and terminating at a selected distance therefrom, said notches being configured and arranged to receive respective actuating elements, the termini of said notches engaging received actuating elements to displace the latter for operating said rheostats.

8. Stage-lighting control apparatus according to claim 7, the termini of said notches being defined by insertions in said notches.

References Cited
UNITED STATES PATENTS

| | | | |
|---|---|---|---|
| 1,684,394 | 9/1928 | Haase | 200—46 |
| 1,933,693 | 11/1933 | Adatte | 200—46 |
| 2,929,042 | 3/1960 | Guttridge et al. | 200—46 X |
| 3,307,133 | 2/1967 | Wolff | 338—131 X |

ROBERT K. SCHAEFER, *Primary Examiner.*

H. J. HOHAUSER, *Assistant Examiner.*